United States Patent [19]

Bell

[11] Patent Number: 4,821,279
[45] Date of Patent: Apr. 11, 1989

[54] GAS LASER

[75] Inventor: William E. Bell, Jerome, Ariz.

[73] Assignees: Harry E. Aine, Philo, Calif.; Essenbee Inc., Jerome, Ariz.; part interest to each

[21] Appl. No.: 708,953

[22] Filed: Mar. 6, 1985

[51] Int. Cl.[4] ............................................. H01S 3/03
[52] U.S. Cl. ....................................... 372/61; 372/62; 372/66; 372/67; 372/76; 372/87; 372/34
[58] Field of Search ....................... 372/34, 35, 61, 62, 372/66, 67, 76, 87, 88

[56] References Cited

U.S. PATENT DOCUMENTS 4,378,600  3/1983  Hobart .................................. 372/63

Primary Examiner—William L. Sikes
Assistant Examiner—Georgia Y. Epps
Attorney, Agent, or Firm—Harry E. Aine

[57] ABSTRACT

In a gas ion laser of the type having a serial array of coaxially aligned axially spaced floating electrodes contained within an evacuable dielectric envelope for exciting a d.c. plasma laser pumping discharge, the electrodes and gas fill are cooled by a plurality of axially directed coolant tubes within the gas-filled envelope. The electrodes have a spherically shaped funnel portion immediately surrounding the laser beam and plasma discharge path for focusing secondary electrons back into the beam path for increasing conversion efficiency. The spherically shaped surfaces are electroplated with a tungsten-cobalt alloy to decrease sputter erosion.

13 Claims, 1 Drawing Sheet

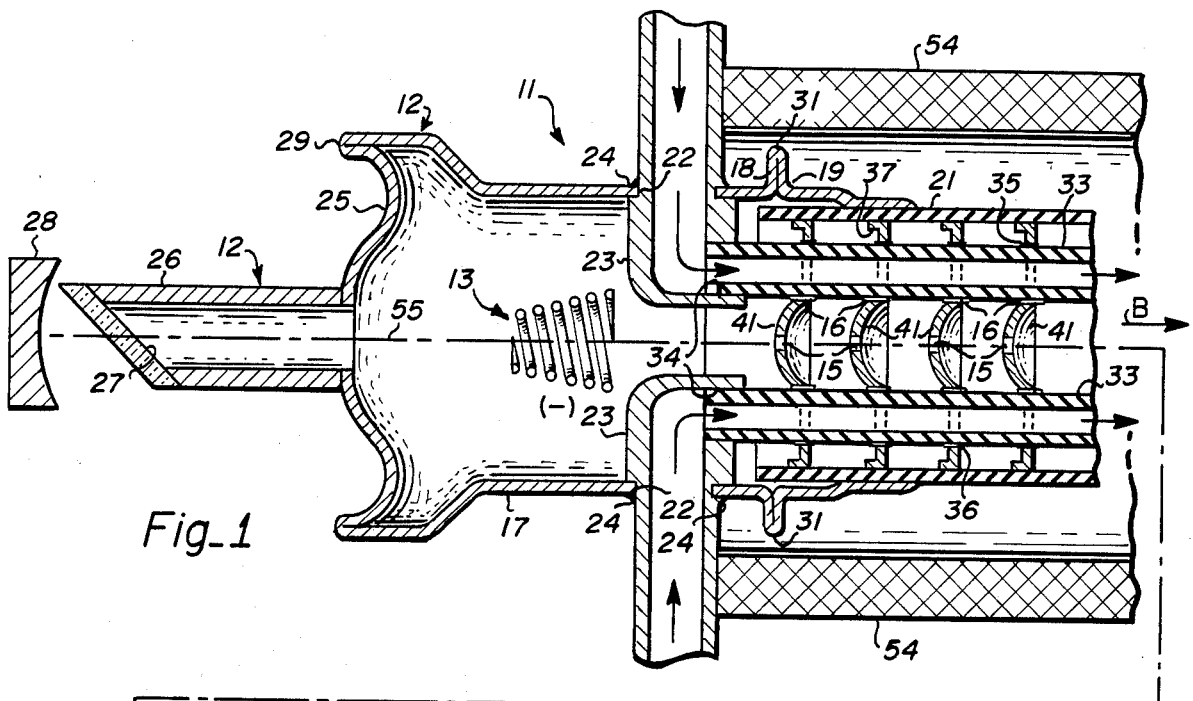
Fig_1
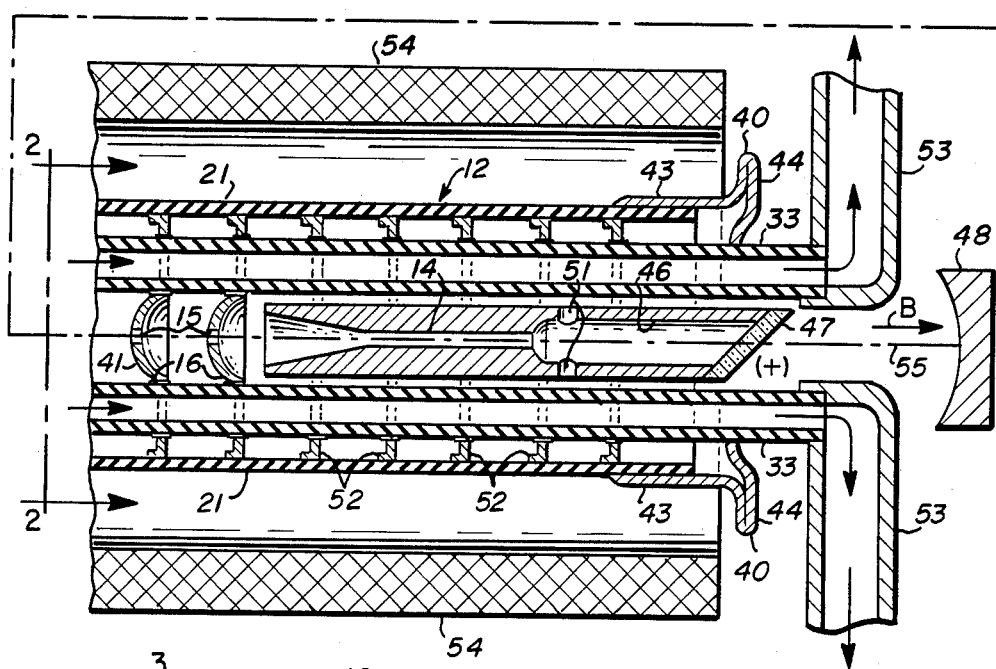
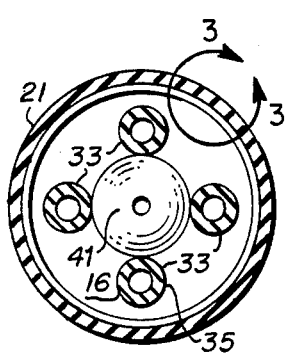
Fig_2
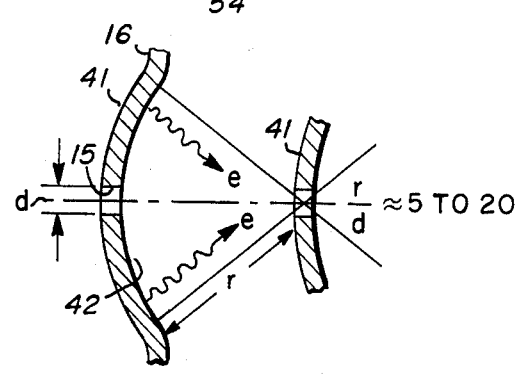
Fig_4    Fig_3

GAS LASER

BACKGROUND OF THE INVENTION

The present invention relates in general to gas lasers and, more particularly, to an improved ion gas laser of the type which includes an array of axially aligned centrally apertured metallic electrodes through which the pumping plasma discharge is obtained in use.

DESCRIPTION OF THE PRIOR ART

Heretofore, ion gas lasers have been manufactured which included an evacuable ceramic envelope housing therewithin a plurality of centrally apertured axially spaced metallic electrodes through which a.d.c. pumping plasma electrical discharge is obtained in use. Heat generated by the electrical discharge was conducted to the exterior of the ceramic envelope by thermal conduction through the metallic disc shaped electrodes to the inside wall of the ceramic vacuum envelope and thence through the thin wall of the envelope to a water coolant jacket surrounding the envelope. The electrode assembly requires skillfully designed jigs and an extremely precise brazing operation for brazing the electrodes to the inside wall of the envelope. If only a single disc fails to bond at its periphery to the inside wall of the ceramic vacuum envelope, the entire electrode structure will not operate properly and is likely to suffer a catastrophic rupture from thermal stresses due to improper cooling.

Also coaxially affixed to the disc-shaped electrode members were cylindrical cooling shields which cool the gas heated by the plasma discharge such that proper gas pumping will occur within the tube. An array of gas return holes were provided at the outer periphery in the electrode members so as to allow return flow of the cooled gas within the tube so as to operate at equalized pressures within the spaces between adjacent axially spaced electrodes.

It is also known from this prior art to coat the region of the electrodes around their central aperture with a sputter resistant coating of vapor deposited tungsten. This tends to reduce the erosion due to ion bombardment of the electrodes in the region of the central apertures, thereby prolonging their operating life.

Ion gas lasers of the aforementioned type are disclosed in U.S. Pat. Nos. 4,378,600 issuing Mar. 29, 1983 and 4,376,328 issuing Mar. 15, 1983.

Gas ion lasers of the above-mentioned type are not very efficient, with nearly all but a small fraction of a percent of the electrical discharge energy appearing as waste heat. It would be desirable to find an improved gas ion laser configuration which would facilitate ease of manufacture and which would provide improved efficiency, longevity, and reliability.

SUMMARY OF THE PRESENT INVENTION

The principal object of the present invention is the provision of an improved gas ion laser of the type having an array of axially spaced centrally apertured electrodes through which an ionized electrical discharge is obtained in use.

In one feature of the present invention, a fluid coolant conduit is provided within the ionizing gas-filled envelope of the ion laser with the electrodes coupled in heat exchanging relation with the conduit for cooling of the electrodes in use.

In another feature of the present invention, the fluid coolant conduit is made of a ceramic insulative material for electrically insulating respective electrodes of the discharge tube.

In another feature of the present invention, the fluid coolant conduits are dimensioned to have sufficient external circumferential area exposed to the gas within the tube for providing substantial cooling of the gases within the envelope so that the viscosity of the gas is reduced in order to allow it to return through gas return holes in the outer peripheries of the various electrodes.

In another feature of the present invention, the apertured electrodes are dish-shaped so as to focus secondary electron emission therefrom into the optical beam path through the axial aligned apertures in the electrodes, whereby the conversion efficiency of the gas laser is increased in use.

In another feature of the present invention, the dish-shaped portions of electrodes are sections of spheres dimensioned such that the ratio of the radius curvature r of the spherical surface to the diameter d of the optical beam path through the apertures in the electrodes falls within the range of 5 to 20.

In another feature of the present invention, the concave surface portion of the dish-shaped electrodes faces away from the direction of flow of the positive ions in the optical beam path for improving the conversion efficiency of the ion gas laser.

In another feature of the present invention, the electrodes of the laser tube are coated with an alloy of tungsten and cobalt to form a sputter resisting coating, thereby protecting the electrodes from sputter erosion in use.

Other features and advantages of the present invention will become apparent upon a perusal of the following specification taken in connection with the accompanying drawings wherein:

BRIEF DESCRIPTION OF THE DRAWINGS

FIG. 1, is a longitudinal dissected sectional view of a gas ion laser incorporating features of the present invention, FIG. 2 is a cross-sectional view of the structure of FIG. 1 taken along line 2—2 in the direction of the arrows, FIG. 3 is an enlarged, detail view of a portion of the structure of FIG. 2 delineated by line 3—3, and FIG. 4 is an enlarged, sectional view of a portion of the structure of FIG. 1 delineated by line 4—4.

DESCRIPTION OF THE PREFERRED EMBODIMENTS

Referring now to FIG. 1, there is shown a longitudinal sectional view of a gas ion laser 11 incorporating features of the present invention. The laser 11 includes an evacuable electrically insulative tubular envelope structure 12, as of ceramic, containing a thermionic cathode 13 at one end and an anode structure 14 at the other end. An electrical d.c. potential applied between anode 14 and cathode 13 excites a d.c. plasma discharge through a plurality of axially aligned apertures 15, as of 1 to 2 mm diameter, in a serial array of disc-shaped electrodes 16, as of copper, coaxially arranged along the length of the evacuable envelope 12 between the cathode 13 and anode 14.

The cathode end of the envelope structure 12 includes a metallic tubular portion 17 having an outwardly flared lip at 18 to which is sealed in a gas-tight manner, as by Heliarc welding 31, a similar flange member 19 joined to a cylindrical ceramic tube 21, as of BeO, (beryllia) forming the central portion of the elongated evacuable envelope 12.

Tubular member 17 is transversely apertured at 22 to receive four quadraturally positioned coolant conduit members 23 passing transversely through the envelope and sealed thereto in a gas-tight manner at 24 as by a suitable adhesive sealant or welding.

The outer rim of tubular envelope portion 17 is closed by means of transverse header 25 which is centrally apertured to receive a tubular section 26, the outer end of which is closed off by a Brewster-angle window 27 axially spaced from a mirror 28 defining one end of an optical resonator coaxially aligned with the laser tube 11. End wall 25 is sealed to tubular portion 17 by means of a Heliarc weld at 29.

The disc electrodes 16, see FIGS. 2 and 3, are carried on four longitudinally directed dielectric tubes 33, as of alumina or beryllia. The cathode ends of the fluid conduit tubes 33 are bonded in a fluid tight manner to ports 34 at the inner ends of the transverse conduit portions 23. The disc-shaped electrodes 16 are apertured in alignment with the fluid conduit tubes 33 for passage of the tubes 33 through the serial array of electrodes 16. The inner lips 35 of the apertures in the discs 16 are bonded in a thermally conductive manner to metallized bands 36 on the exterior of the tubular conduits 33 by means of a thermally conductive adhesive, as of model 503 from Aremco Products, Inc. of Ossining, N.Y. In a typical example, the metallic bands 36 formed on the ceramic fluid conduit 33 comprises a silver palladium ink such as Type A-3809, commercially available from Englehardt Industries, Division of Englehardt Corporation, Electronics Materials Systems, East Newark, N.J.

The disc electrodes 16 are jigged and bonded to the respective fluid conduit tubes 33 so that the central apertures 15 are in precise coaxial alignment down the length of the tube. The tubes 33 with the electrodes 16 affixed thereto are then bonded at the cathode end to the four transverse fluid conduit members 23. The outer peripheries of the disc-shaped electrodes 16 include a peripheral flange portion 37, which is serrated as shown in FIG. 3, to provide a multiplicity of gas return passageways 38 around the periphery of each of the electrodes 16 and to further provide a certain amount of resilience and flexibility to the outer periphery of the electrodes 16. The outer periphery of the disc-shaped electrodes 16 make a sliding interference fit with the inside bore of the tubular envelope portion 21 so as not to disturb the precise axial alignment of the electrodes as carried upon the fluid conduit tubes 33.

The central region of each disc electrode 16 is spherically dished at 41 to provide funnel-like portions with the wide or open end of the funnel portions facing toward the anode electrode 14. The spherical funnel portions 41 (See FIG. 4) preferably have a radius of curvature r equal to the axial spacing of the adjacent electrodes 16 so as to focus the secondary electron emission from the spherical portion back to the adjacent aperture 15. In addition, the diameter d of the central apertures 15 are preferably related to the radius of curvature of the spherical portions 41 by the ratio (r/d) falling within the range of 5 to 20. The central apertures 15 have increasing diameter taken toward the cathode in a transition section at the cathode end of the tube 11.

The concave, spherical surfaces of the electrodes 16 are preferably coated with a sputter resistant layer 42 comprised of a tungsten-cobalt alloy containing up to 50% tungsten with cobalt. A suitable plating solution for deposition of the cobalt-tungsten alloy is as follows:

|  | N |  | g/l | oz/gal |
|---|---|---|---|---|
| Cobalt chloride, $CoCl_2 6H_2O$ | 0.9 |  | 102 | 14 |
| Sodium tungstate, $Na_2WO_4 2H_2O$ | 0.8 |  | 45 | 6 |
| Rochelle salt, $NaKC_4H_4O_6 4H_2O$ | 1.4 | (M) | 400 | 53 |
| Ammonium chloride, $NH_4Cl$ | 1.0 |  | 50 | 7 |
| pH, 8.5 (adjusted with $NH_4OH$) |  |  |  |  |
| Temperature, 90 degrees C. (194 degrees F.) |  |  |  |  |
| Current density, 2-5 amp/$cm^2$ (20-50 amp/$ft^2$) |  |  |  |  |

Tugsten anodes are used. The tungsten content of the deposit, up to about 50% by weight, increases if the ratio of tungsten to cobalt in the solution is increased or if the current density is increased.

The deposits produced are relatively hard, e.g., 400 to 600 Vickers, and when they are heated, in air, $H_2$ or $N_2$, to 600 degrees C., they become harder by precipitation hardening. A sputter resistant layer 42 is conveniently formed by selectively electroplating the tungsten-cobalt alloy onto copper electrodes 16. In a typical example, the copper disc electrodes 16 have a thickness of about 0.5 millimeters and the tungsten-cobalt alloy is selectively electroplated onto the central portion of the electrode 16 to a thickness of 0.1 millimeters.

The anode end of the central tubular envelope portion 21 is sealed in a gas-tight manner by means of an end header member which is apertured to receive the four fluid conduit tubes and anod electrode 14 and to be bonded thereto in a gas-tight manner via the ceramic adhesive material used to bond the electrodes 16 to the fluid conduit tubes 33. Header is sealed in a gas-tight manner as by Heliarc welding at to a flange member 43 carried on the end of the tubular envelope portion 21 in a gas-tight manner.

The anode electrode 14 is centrally apertured and includes a tubular extension at 46 which is closed off in a gas-tight manner by means of a Brewster-angle window 47. A second mirror 48, is axially aligned with the optical beam path to form the other end of the optical resonator defined between the mirrors 28 and 48. The anode electrode 14 includes a plurality of transverse bores at 51 providing a gas passageway between the interior bore of the anode and the annular region surrounding the anode to allow gases to pass axially of the tube around the outer peripheries of the disc electrode members 16. A plurality of supporting disc members 52 are bonded to the respective fluid conduit tubes 33 and to the outer periphery of the anode 14 for supporting the anode and for allowing thermal conductive cooling thereof in use.

The anode ends of the fluid conduit tubes 33 are bonded in a fluid tight manner to the inner elbow portions of transversely directed exit fluid conduit members 53. A magnetic solenoid 54 axially surrounds the tubular envelope 12 for providing an axial magnetic field coaxially aligned with the optical beam path 55.

In operation, the evacuable envelope 12 is evacuated to a low pressure as of $10^{-6}$ torr and then back-filled with a suitable ion gas laser medium such as argon or krypton to a suitable operating pressure such that the mean free path of the molecules is on the order of the radius of the tubular envelope portion 21. Operating potentials are then applied between anode and cathode to establish a plasma discharge along the optical axis 55 of the tube and through the central bores 15 in the series of disc electrodes 16.

The plasma discharge between the electrodes 16 produces a population inversion of the latent transitions of the gaseous medium so as to produce intense laser action along the optical beam path 55 within the optical resonator formed by mirrors 28 and 48. One of the mirrors, 28 or 48, is partially transmissive at the operating wavelength of the optical resonator to allow a portion of the beam to be extracted from the resonator.

Some of the positive ions generated within the intense plasma discharge collide with the spherical surface of the electrodes 16 to produce energetic secondary electrons which are thence focused back into the laser beam path and plasma discharge for enhancing the distribution of energetic electrons and thus for increasing the operating efficiency of the laser 11. Heat generated in the region of the plasma discharge and generally on the axis of the tube, is conducted through the thermally conductive electrodes 16 to the fluid contained within the fluid coolant passageways 33 and thus extracted from the tube, in use. Each disc electrode 16, when properly bonded to the fluid coolant tubes, 33, can heat sink several hundred watts of discharge power at the central aperture without producing a temperature rise in excess of 50 degrees C. of the electrodes. A typical high-power gas ion laser tube 11 may be up to a meter or more in length and may contain on the order of 100 electrode discs 16.

The fluid coolant tubes 33 are preferably dimensioned so that their combined circumference, that is the total circumference of all of the tubes 33, is approximately equal to or greater than the internal circumference of the tubular envelope 21. In this manner, energetic gaseous molecules, produced in the plasma discharge, upon contacting the coolant tubes 33 cools the temperature of the gas, thereby decreasing its viscosity such that the gas, at the outer periphery of the electrodes 16, may readily pass through the gas return passageways 38. On axis, the positive ions travel toward the cathode.

It turns out that the funnel shaped portions of the electrodes 16 produce a substantial pumping effect, that is a migration of the gas toward the cathode end of the tube. This would, normally, produce a depletion of the gas at the anode end of the tube, thereby extinguishing the discharge. However, by providing the coolant tubes 33, the gas can be cooled and pressure can reach an equilibrium by passing axially of the tube through the gas return bypass apertures 38 at the periphery of the electrodes 16. The funnel shaped electrodes serve to increase the voltage drop per unit of the tube by increasing the conversion efficiency of the tube.

The advantages of the gas ion laser tube 11 of the present invention include increased operating efficiency, improved reliability and increased longevity.

What is claimed is:

1. In a method for producing laser radiation from an excited ionized gas at subatmospheric pressure, the steps of:
   passing a first stream of thermionic electrons from a thermionic cathode emitter through an ionizable gas at subatmospheric pressure to an anode in said ionizable gas for ionizing the gas by collision therewith and for producing a column of positive gas ions within the first electron stream due to collisions therewith;
   colliding a second electron stream emanating from a secondary electron emitter with said column of positive ions for populating an excited electronic state of said ions; and
   resonating optical laser radiation emanating from electronic transitions of the positive gas ions from said excited electronic state to a lower energy state.

2. The method of claim 1 wherein the step of resonating laser radiation includes the step of;
   optically coupling said laser radiation to an optically resonant mode of an optical resonator for stimulating coherent emission of optical radiation from said excited ions.

3. The method of claim 1 wherein the step of colliding said second electron stream with said column of positive gas ions includes the steps of:
   shaping said secondary electron emitter into a concave shape so as to focus said second electron stream into said column of positive gas ions.

4. The method of claim 1 including the step of passing the first electron stream from said thermionic cathode emitter through a beam defining aperture in a member for constricting the transverse dimension of the first electron stream to a diameter of less than ten millimeters for increasing the current density of the first electron stream in the collision region.

5. The method of claim 1 including the step of disposing said secondary electron emitter around the outside of said first electron stream and shaping said secondary emitter for focusing said second electron stream into said column of positive gas ion of said first electron stream.

6. In a ion laser apparatus of the type having a thermionic cathode emitter and an anode electrode disposed within an envelope containing an ionizable gas at subatmospheric pressure for producing a first stream of electrons between said cathode and anode electrode for ionizing the ionizable gas and for producing a column of positive ions within the first stream of electrons, the improvement comprising:
   second cathode emitter means disposed within said envelope for bombardment by ions emanating from an ionized region of the ionizable gas for producing a second stream of electrons by secondary electron emission therefrom;
   directing means operatively associated with said second cathode emitter means for colliding said second stream of electrons with the column of positive ions within said first electron stream for exciting and populating an excited electronic state of said ions; and
   means for resonating optical laser radiation emanating from electronic transitions of the excited positive gas ions from said excited state to a lower energy state.

7. The apparatus of claim 6 wherein said means for resonating laser radiation includes optical resonator means optically coupled to said interacted and excited ions for stimulating coherent emission of optical radiation from said excited ions.

8. The apparatus of claim 6 wherein said directing means includes the shape of said second cathode emitter means for focusing said second electron stream into said column of positive gas ions.

9. The apparatus of claim 8 including:
   electrical insulator means for electrically insulating said secondary electron emitter means relative to the electrical potential of said themionic cathode emitter for operation of said secondary electron emitter means at a potential different than that of said thermionic cathode emitter.

10. The apparatus of claim 6 including:
means for constricting the transverse dimension of the first thermionic electron stream to a diameter d for increasing the current density of said first electron stream in said collision region.

11. The apparatus of claim 8 wherein said second cathode emitter means is disposed around the outside of said first electron stream.

12. The apparatus of claim 10 wherein second cathode emitter means includes a concave surface portion having a radius of curvature r for focusing said second stream of secondary electrons into said collision region and wherein the ratio of r to d falls within the range of 5 to 20.

13. The apparatus of claim 11 wherein said second cathode emitter means includes a concave secondary electron emitting surface made of a material selected from the group comprising, tungsten, cobalt, and tungsten cobalt alloy.

* * * * *